US007007887B2

(12) United States Patent
van de Camp

(10) Patent No.: US 7,007,887 B2
(45) Date of Patent: Mar. 7, 2006

(54) TUBULAR CORE WITH POLYMER PLIES

(75) Inventor: Johannes Wim van de Camp, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 125 days.

(21) Appl. No.: 10/705,018

(22) Filed: Nov. 11, 2003

(65) Prior Publication Data
US 2005/0098679 A1    May 12, 2005

(51) Int. Cl.
B65H 75/18    (2006.01)
G09F 3/10    (2006.01)
(52) U.S. Cl. ............... 242/609.4; 242/610.1; 242/118.32; 40/299.01; 40/660
(58) Field of Classification Search ............ 242/609.4, 242/610.1, 118.32, 118.8; 138/142, 144, 138/141; 156/195, 425, 431; 428/34.2, 428/37; 40/660, 299.01
See application file for complete search history.

(56) References Cited

U.S. PATENT DOCUMENTS

| | | | | |
|---|---|---|---|---|
| 2,755,821 A | * | 7/1956 | Stahl | 138/144 |
| 2,895,511 A | * | 7/1959 | Seltman | |
| 3,070,281 A | * | 12/1962 | Durkin et al. | 138/144 |
| 3,115,246 A | | 12/1963 | Wicklund | |
| 3,170,489 A | | 2/1965 | Cunningham | |
| 3,179,245 A | | 4/1965 | Bastian, Jr. | |
| 3,204,763 A | * | 9/1965 | Gustafson | |
| 3,364,955 A | * | 1/1968 | Gustafson | 138/144 |
| 3,448,774 A | * | 6/1969 | Nelms | 138/144 |
| 3,451,433 A | * | 6/1969 | Cunningham et al. | 138/144 |
| 3,457,130 A | * | 7/1969 | Morrison | 138/144 |
| 3,497,413 A | | 2/1970 | Ullman et al. | |
| 3,548,883 A | * | 12/1970 | Cohen | 138/144 |
| 3,595,046 A | | 7/1971 | Malkki | |
| 3,606,779 A | | 9/1971 | Parma | |
| 3,782,889 A | | 1/1974 | Panico | |
| 3,841,937 A | * | 10/1974 | Erwin | |
| 3,856,225 A | | 12/1974 | Wray | |
| 4,013,102 A | * | 3/1977 | DeLorean et al. | 138/144 |
| 4,287,244 A | | 9/1981 | McMahon, Jr. et al. | |
| 4,714,508 A | | 12/1987 | Chivens et al. | |
| 4,867,671 A | | 9/1989 | Nagayoshi et al. | |
| 4,878,976 A | * | 11/1989 | Asakura | 156/195 |
| 4,907,696 A | | 3/1990 | DeCoste, Jr. | |
| 4,957,586 A | | 9/1990 | Keldany et al. | |

(Continued)

FOREIGN PATENT DOCUMENTS

DE    003105828 A1    9/1982

(Continued)

OTHER PUBLICATIONS

Search Report, PCT/US2004/037368, Nov. 10, 2004, EPO Patent Office, Sonoco Development, Inc.

Primary Examiner—William A. Rivera
(74) Attorney, Agent, or Firm—Alston & Bird LLP

(57) ABSTRACT

A tubular core and associated method of manufacture are provided. The tubular core includes at least one inner ply and at least two plastic plies disposed thereon. The inner ply, which can be paper or plastic, has an inner surface upon which identifying indicia are printed, for example, before the tube is formed and while the inner ply is in a flat configuration. The first and second plastic plies are disposed on the inner ply and adhered so that the second plastic ply substantially covers the inner ply and the first plastic ply.

30 Claims, 2 Drawing Sheets

U.S. PATENT DOCUMENTS

| | | | |
|---|---|---|---|
| 4,963,211 A | 10/1990 | Allen et al. | |
| 5,024,712 A | 6/1991 | Lecourt et al. | |
| 5,167,994 A * | 12/1992 | Paulson | 428/34.2 |
| 5,302,221 A | 4/1994 | Golden | |
| 5,829,713 A * | 11/1998 | Kewin | |
| 5,875,983 A * | 3/1999 | Stuckey et al. | 242/118.32 |
| 5,944,060 A * | 8/1999 | MacKay | 138/141 |
| 5,945,138 A | 8/1999 | Wise et al. | |
| 6,066,373 A | 5/2000 | Floyd, Jr. et al. | |
| 6,193,186 B1 * | 2/2001 | Kewin | |
| 6,241,840 B1 | 6/2001 | Pratt et al. | |
| 6,394,385 B1 | 5/2002 | Rhodes et al. | |
| 6,405,969 B1 | 6/2002 | Ogren et al. | |
| 6,589,648 B1 * | 7/2003 | Schurig | |
| 6,719,242 B1 * | 4/2004 | Floyd et al. | 242/609.4 |
| 2002/0066824 A1 * | 6/2002 | Floyd et al. | 242/609.4 |
| 2003/0178082 A1 * | 9/2003 | Yamaguchi et al. | 138/144 |

FOREIGN PATENT DOCUMENTS

| | | | | |
|---|---|---|---|---|
| EP | 0 525 796 A1 | 2/1993 | | |
| EP | 0525796 A1 * | 2/1993 | | 242/609.4 |
| EP | 1 088 645 A | 4/2001 | | |
| GB | 1 129 786 A | 10/1968 | | |
| GB | 2 292 369 A | 2/1996 | | |
| JP | 05 052264 B | 8/1993 | | |
| JP | 2002 160312 A | 6/2002 | | |

* cited by examiner

TUBULAR CORE WITH POLYMER PLIES

BACKGROUND OF THE INVENTION

1. Field of the Invention

This invention relates to a tubular core that can be used for winding tape, yarn, and the like and, more particularly, to a spirally-wound tubular core that includes at least one polymer ply.

2. Description of Related Art

Tubular cores are typically used for supporting wound lengths of tape, yarn, paper, and the like. Such cores are found in products intended for consumer use, medical applications, manufacturing, and the like. For example, tubular cores are often used to wind adhesive tape and support the resulting roll of tape in a dispenser. One conventional tubular core for adhesive tape is formed by spirally winding a paper ply on a mandrel to form a paper tube. Multiple paper plies can be layered on the mandrel with an adhesive disposed therebetween so that the resulting tube is stiff. The tube is then cut to form a number of tubular cores, each having a desired length. Additionally, the innermost paper ply can be printed before winding, for example, with text, other indicia, or colors to indicate the tape manufacturer, the type of tape, and the like.

Although widely used, such paper cores are inappropriate or unacceptable for certain applications. For example, tape for medical and clean manufacturing applications is used in controlled environments where the production of dust associated with the paper cores is undesirable. The paper cores are also generally not clean enough for use in controlled medical environments. In addition, the paper cores tend to lack dimensional stability, especially when stressed or subjected to moisture and temperature variations. Changes in the size of the cores can complicate the winding process, for example, where multiple paper cores are adjacently positioned on a shaft and rotated in unison to wind a ribbon of tape on each core. Changes and dissimilarities in the length of the cores can result in some of the ribbons of tape being wound partially onto more than one core, i.e., two adjacent cores, such that the adjacent cores cannot be separated after winding. The paper cores can also weaken if subjected to moisture after winding. Thus, yarn or other products wound on the cores can result in a radially compressive load that exceeds the strength of the weakened cores, thereby causing the cores to collapse. Further, many adhesives used for tapes adhere to the paper cores. When the innermost end of the tape is removed from the core, paper fibers are lifted from the core by the tape. Thus, the end of the tape is generally unusable, and the removal of the tape from the core can make dust that is unacceptable in some environments.

Extruded or injection-molded plastic cores are sometimes used instead of paper rolls, for example, for adhesive tapes. Plastic cores can be clean and are typically dust free, even when the tape is completely removed from the core. In addition, plastic cores are generally dimensionally stable throughout a range of temperatures and moistures. However, some cores can be difficult to form to precise dimensions by extrusion and injection molding, especially larger cores such as those with an inner diameter of about 3 inches or more. Moreover, printing on the inside of the plastic cores can be difficult.

Thus, there exists a need for a tubular core that can be used to support wound products such as tape, yarn, paper, and the like. The core should be compatible with conventional printing methods so that indicia or colors can be provided thereon. Preferably, the core should be dimensionally stable when subjected to moisture or other environmental changes. Further, the core should allow the removal of the wound product without generating unacceptable dust or other debris.

SUMMARY OF THE INVENTION

The present invention provides a tubular core and associated method of manufacture. The tubular core includes at least one inner ply and at least two plastic plies disposed thereon. The inner ply, which can be formed of paper or plastic, has an inner surface upon which identifying indicia are printed, for example, while the inner ply is in a flat configuration. The first plastic ply is disposed on the inner ply and adhered thereto, and the second plastic ply is disposed on the first plastic ply so that the second plastic ply substantially covers the inner ply and the first plastic ply. The plastic plies can reduce or eliminate the creation of dust during use of the product and can provide a release surface from which the product can be removed.

According to one embodiment of the present invention, one or both of the plastic plies are formed of polystyrene. The plastic plies can be a deformable foam, and each can have a thickness of about 0.02 inches, for example, with the plastic plies making up about 75–85% of the thickness of the core. The first ply can cover the outer surface of the inner ply, and each of the inner and first plastic plies can define helical seams that are covered by the first and second plastic plies, respectively. Further, the plies can be adhered by adhesives or by welding.

The present invention also provides a method for manufacturing a tubular core for receiving a product wound thereon. A first side of at least one inner ply is printed with identifying indicia, and the inner ply is then spirally wound onto a mandrel that extends in a longitudinal direction so that the inner ply forms a tubular body. A first plastic ply is spirally wound onto an outer surface of the inner ply and adhered thereto. A second plastic ply is spirally wound onto an outer surface of the first plastic ply so that the second plastic ply substantially covers the inner ply and the first plastic ply, and the second plastic ply is adhered to the first plastic ply. The outer surface of the inner ply can be covered with the first plastic ply, and the second plastic ply can at least partially overlap a helical seam of the first plastic ply. The plastic plies can be adhered with an adhesive or by welding.

BRIEF DESCRIPTION OF THE DRAWINGS

Figure 1:
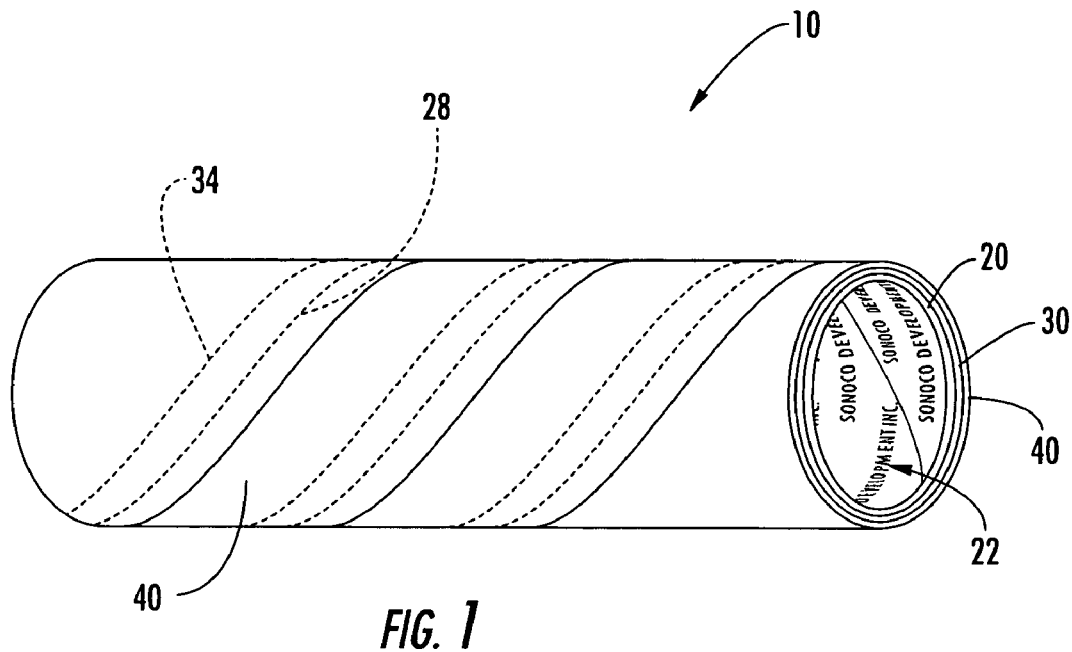
Figure 2:
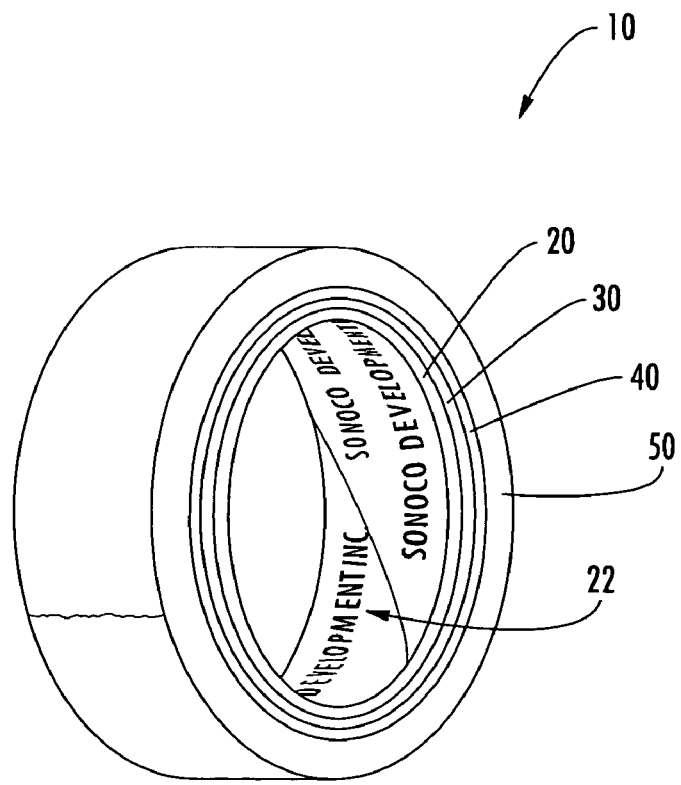
Figure 3:
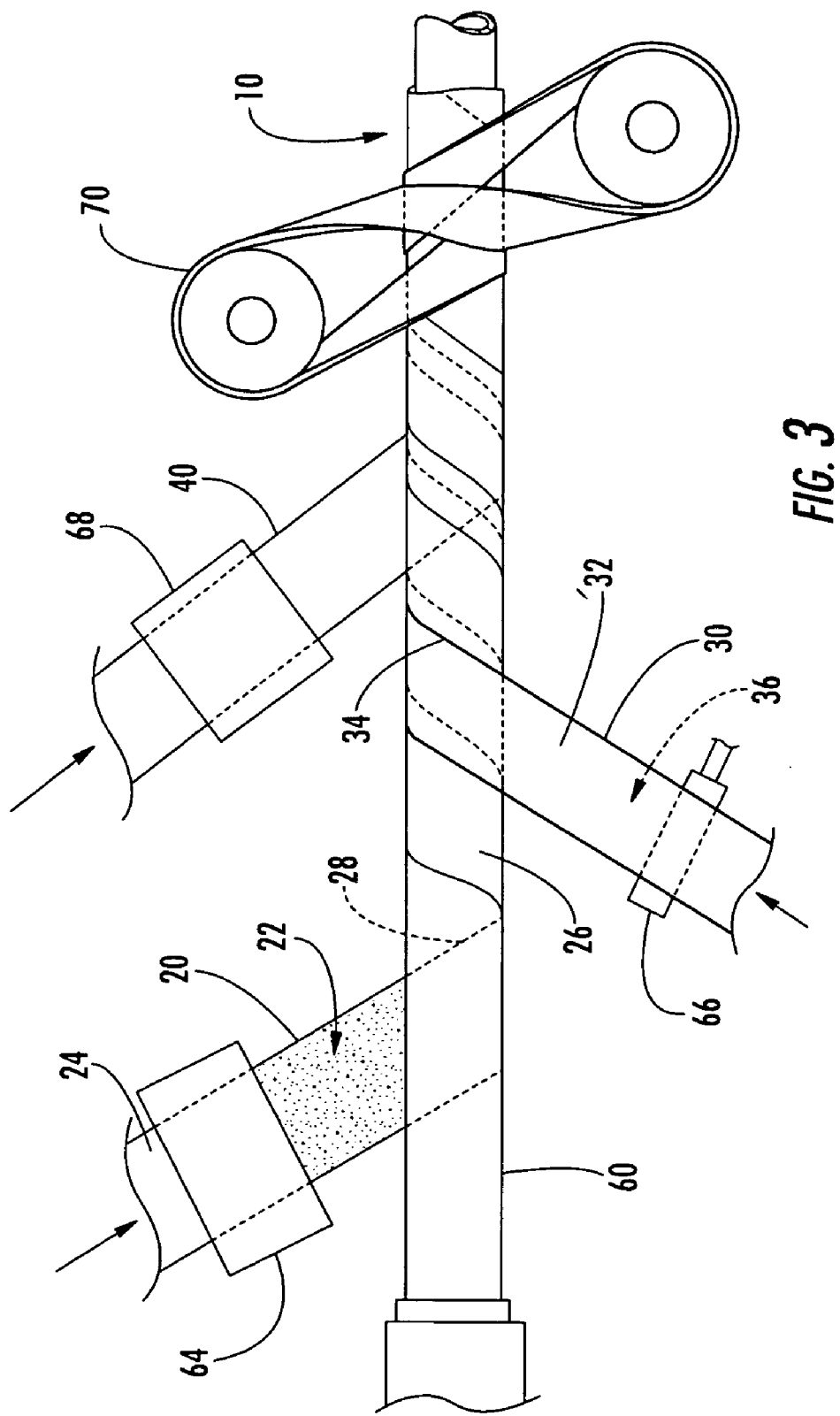

Having thus described the invention in general terms, reference will now be made to the accompanying drawings, which are not necessarily drawn to scale, and wherein:

FIG. 1 is a perspective view illustrating a tubular core according to one embodiment of the present invention;

FIG. 2 is a perspective view illustrating a tubular core formed from a portion of the core shown in FIG. 1, and upon which an adhesive tape has been wound; and FIG. 3 is a plan view illustrating the tubular core of FIG. 1 during manufacture according to one embodiment of the present invention.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to the figures, and in particular to FIG. 1, there is shown a tubular core 10 according to one embodiment. The tubular core 10 can be used for a variety of applications, including supporting a product that is wound thereon. For example, adhesive tape 50 (FIG. 2), paper, other laminar webs, yarn, thread, other textiles, and the like can be wound upon the core 10. The core 10 can be provided in a variety of lengths according to the application. Thus, as shown in FIG. 2, the core 10 can be cut to shorter portions, for example, of between about 0.125 and 4 inches in length, to correspond to the width of the adhesive tape 50 or other product that is wound on the core 10. An inner ply 20 of the core 10 is printed with identification indicia 22 such as words, symbols, portions of one or more colors, and the like. The identification indicia 22 can identify the manufacture of the core 10 or the product provided thereon, the type or characteristics of the product, and the like.

The inner ply 20 can be formed of a variety of materials including paper, such as paperboard or a laminate of multiple paper layers. Alternatively, the inner ply 20 can be formed of plastics including, but not limited to, polystyrene, such as polystyrene foam. Each core 10 also has at least two plastic plies 30, 40 disposed on the inner ply 20. The plastic plies 30, 40 can be formed of numerous plastics such as polystyrene. The thicknesses of the plies 20, 30, 40 can vary. In one embodiment, the combined thickness of the plastic plies 30, 40 is between about 75% and 85% of the total thickness of the plies 20, 30, 40. For example, as illustrated in FIG. 2, the inner ply 20 is paper having a thickness between about 0.009 and 0.012 inches, and each of the plastic plies 30, 40 is formed of polystyrene foam having a thickness of about 0.02 inches.

The plastic plies 30, 40 can be dimensionally stable, i.e., the plastic does not substantially expand, contract, or otherwise deform as a result of moisture, temperature variations, and other environmental conditions. However, where foam polystyrene or other expanded polymers are used, the plies 30, 40 can be slightly deformable. Thus, the cores 10 can be compressed or expanded slightly during manufacture and during subsequent winding of the product thereon. In addition, if the core 10 is subjected to moisture or temperature variations after the tape 50 or another product material is wound thereon, and the inner ply 20 or the wound product expands or contracts, the deformable plastic plies 30, 40 can be compressed or expanded accordingly. Alternatively, the plies 30, 40 can be formed of plastic that is sufficiently nondeformable to resist such dimensional changes.

The plastic plies 30, 40 can be substantially free of dust and debris. The cores 10 can also be sufficiently clean for use in medical or clean manufacturing environments. Further, the second plastic ply 40 can be formed of a plastic from which the product is easily removed so that an outer surface of the ply 40 provides a release layer for removal of the product. Depending on the requirements of the particular application for the core 10, the inner ply 20 can also be formed of paper or plastic that is substantially dust free.

FIG. 3 illustrates a core 10 during formation according to one embodiment of the present invention. The inner and plastic plies 20, 30, 40 can be provided on rolls (not shown) and are disposed at successive positions onto a mandrel 60 having an axis extending in a longitudinal direction. A spiral winding belt 70 can be used rotate the core 10 about the mandrel, thereby winding the plies 20, 30, 40 on the mandrel 60 and driving the core 10 in the longitudinal direction along the mandrel 60, i.e., toward the right as shown in FIG. 3. The formed core 10 is continuously driven off of an end (not shown) of the mandrel 60 during forming.

A print device 64 is provided for printing the identification indicia 22 on an inner surface 24 of the inner ply 20 before the ply 20 is spirally wound. The inner ply 20 can be printed in conjunction with the winding, as shown in FIG. 3, or the ply 20 can be printed at a remote location separate from the winding operation. In either case, the inner ply 20 is printed before the ply 20 is wound, for example, while the inner ply 20 is in a flat configuration. Thus, the indicia 22 can be printed on the inner ply 20 using conventional printing devices and methods. The indicia 22 can be a repetitive pattern that is printed at successive locations on the ply 20 so that if the core 10 is cut to form a number or shorter cores 10, the information provided by the indicia 22 will be on each core 10.

The inner ply 20 is spirally wound onto the mandrel 60 so that the inner surface 24 is directed toward the mandrel 60 and an outer surface 26 of the inner ply 20 is directed away from the mandrel 60. The first plastic ply 30 is spirally wound on the mandrel 60 and thereby disposed on the inner ply 20 so that an outer surface 32 of the first plastic ply 30 is opposite the inner ply 20. The second plastic ply 40 is also spirally wound on the mandrel 60 and thereby disposed on the outer surface 32 of the first plastic ply 30.

The plastic plies 30, 40 are disposed onto the mandrel 60 in a staggered configuration. For example, a helical interface or seam 28 formed between successive winds of the inner ply 20 can be covered by the first plastic ply 30. Similarly, a helical seam 34 formed between successive winds of the first plastic ply 30 can be covered by the second plastic ply 40. The first plastic ply 30 can be disposed to substantially completely cover the inner ply 20, and the second plastic ply 40 can be disposed to substantially completely cover the inner ply 20 and the first plastic ply 30. The plies 20, 30, 40 shown in FIG. 3 are equal in width, and each is wound onto the mandrel 60 without substantial space between successive winds; however, in other embodiments, the plies 20, 30, 40 can have different widths and/or can be wound with space or overlaps at the seams of the successive winds.

The plies 20, 30, 40 are adhered to one another, for example, by an adhesive or by welding. As shown in FIG. 3, an applicator 66 is provided for applying a glue or other adhesive to the first plastic ply 30. The applicator 66 can be configured to spray, roll, or otherwise apply the adhesive to an inner surface 36 of the first plastic ply 30. A second applicator (not shown) can be provided for applying adhesive to the outer surface 32 of the first plastic ply 30 or an inner surface of the second plastic ply 40. Alternatively, the plies 20, 30, 40 can be adhered by welding. For example, a heater 68, such as a gas-fired or electric heating device, is provided for heating the second plastic ply 40 as the ply 40 passes therethrough. Thus, the second plastic ply 40 is softened or partially melted and disposed onto the first plastic ply 30. In other embodiments of the present invention, the plies 20, 30, 40 can be adhered using other configurations of adhesives and welds. Additionally, it is understood that the adhesive can be applied in other manners, for example, to either or both of the adhered surfaces of the plies 20, 30, 40, or as a film disposed between the plies 20, 30, 40.

The spiral winding belt 70 can be used compress the plies 20, 30, 40 on the mandrel 60 and to drive the core 10 along the mandrel 60. As illustrated in FIG. 3, each of the plies 20, 30, 40 can be wound onto the mandrel upstream of the winding belt 70, i.e., to the left of the belt 70 as shown in FIG. 3, so that the belt 70 pulls the plies 20, 30, 40 along the mandrel 60. Alternatively, one or more of the plastic plies 30, 40 can be wound onto the mandrel 60 downstream of the belt 70. Before or after the formed core 10 is driven off of an end (not shown) of the mandrel 60, the tube 10 can be cut into desired lengths. Each resulting core 10 can then be wound with tape, yarn, or other products, or otherwise used.

Many modifications and other embodiments of the invention will come to mind to one skilled in the art to which this invention pertains having the benefit of the teachings presented in the foregoing descriptions and the associated drawings. For example, it is understood that additional plies of paper, plastic, or other materials can be disposed on the mandrel 60 during the forming process shown in FIG. 3 such that the core 10 includes more than three plies. Further, each of the plies 20, 30, 40 can be formed of a variety of thermoset and thermoplastic materials including polystyrene, polyethylene, polypropylene, and the like. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tubular core for receiving a product wound thereon, the core comprising:
    at least one inner ply wrapped about a longitudinal axis to form a tubular body having an inner surface and an outer surface, the inner surface of the inner ply being printed with identifying indicia, the inner ply being paper;
    a first plastic ply disposed on the outer surface of the inner ply and adhered to the inner ply, the first plastic ply having an outer surface disposed opposite the inner ply; and
    a second plastic ply disposed on the outer surface of the first plastic ply and adhered to the first plastic ply, the second plastic ply substantially covering the inner ply and the first plastic ply.

2. A tubular core according to claim 1 wherein at least one of the first and second plastic plies is formed of a polymer foam.

3. A tubular core according to claim 1 wherein at least one of the first and second plastic plies is polystyrene.

4. A tubular core according to claim 1 wherein the first plastic ply covers the outer surface of the inner ply.

5. A tubular core according to claim 1 wherein the inner ply and the first and second plastic plies are spirally wound such that each ply defines a helical seam and the second plastic ply at least partially overlaps the seam defined by the first plastic ply.

6. A tubular core according to claim 1 wherein the first plastic ply is adhered to the inner ply with an adhesive and the second plastic ply is adhered to the first plastic ply with an adhesive.

7. A tubular core according to claim 1 wherein the second plastic ply is adhered to the first plastic ply by welding.

8. A tubular core according to claim 1 wherein each of the first and second plastic plies has a thickness of at least about 0.02 inch.

9. A tubular core according to claim 1 wherein the combined thickness of the plastic plies is between about 75% and 85% of the combined thickness of the at least one inner ply and the plastic plies.

10. A tubular core according to claim 1, further comprising the product circumferentially wound over the second plastic ply.

11. A tubular core according to claim 10 wherein the product is tape.

12. A tubular core for receiving a product wound thereon, the core comprising:
    at least one inner ply spirally wrapped about a longitudinal axis to form a tubular body having an inner surface and an outer surface, the inner surface of the inner ply being printed with identifying indicia, the inner ply being paper;
    a first plastic ply spirally wrapped on the outer surface of the inner ply to define a helical seam, the first plastic ply covering the outer surface of the inner ply and adhered thereto, and having an outer surface disposed opposite the inner ply, and
    a second plastic ply spirally wrapped on the outer surface of the first plastic ply and adhered to the first plastic ply, the second plastic ply at least partially overlapping the seam defined by the first plastic ply and substantially covering the inner ply and the first plastic ply.

13. A tubular core according to claim 12 wherein at least one of the first and second plastic plies is formed of a polymer foam.

14. A tubular core according to claim 12 wherein at least one of the first and second plastic plies is polystyrene.

15. A tubular core according to claim 12 wherein the first plastic ply is adhered to the inner ply with an adhesive and the second plastic ply is adhered to the first plastic ply with an adhesive.

16. A tubular core according to claim 12 wherein the second plastic ply is adhered to the first plastic ply by welding.

17. A tubular core according to claim 12 wherein each of the first and second plastic plies has a thickness of at least about 0.02 inch.

18. A tubular core according to claim 12 wherein the combined thickness of the plastic plies is between about 75% and 85% of the combined thickness of the at least one inner ply and the plastic plies.

19. A tubular core according to claim 12, further comprising the product circumferentially wound over the second plastic ply.

20. A tubular core according to claim 19 wherein the product is tape.

21. A method for manufacturing a tubular core for receiving a product wound thereon, the method comprising:
    printing a first side of at least one inner ply of paper with identifying indicia; spirally winding the at least one inner ply onto a mandrel extending in a longitudinal direction such that the inner ply forms a tubular body with the first side disposed radially inward to form an inner surface and having an outer surface opposite the inner surface;
    spirally winding a first plastic ply onto the outer surface of the inner ply and adhering the first plastic ply thereto, the first plastic ply having an outer surface disposed opposite the inner ply, and
    spirally winding a second plastic ply onto the outer surface of the first plastic ply and adhering the second plastic ply thereto such that the second plastic ply substantially covers the inner ply and the first plastic ply.

22. A method according to claim 21 further comprising providing a polystyrene ply as at least one of the first and second plastic plies.

23. A method according to claim 21 further comprising deforming at least one of the first and second plastic plies during winding.

24. A method according to claim 21 wherein said second spirally winding step comprises covering the outer surface of the inner ply with the first plastic ply.

25. A method according to claim 21 wherein said third spirally winding step comprises disposing the second plastic ply at least partially overlapping a helical seam of the first plastic ply.

26. A method according to claim 21 wherein said second and third spirally winding steps comprise adhering the first plastic ply to the inner ply with an adhesive and adhering the second plastic ply to the first plastic ply with an adhesive.

27. A method according to claim 21 wherein said second and third spirally winding steps comprise adhering the first plastic ply to the inner ply by welding and adhering the second plastic ply to the first plastic ply by welding.

28. A method according to claim 21 further comprising providing the first and second plastic plies, each having a thickness of at least about 0.02 inch.

29. A method according to claim 21, further comprising winding the product circumferentially over the second plastic ply.

30. A method according to claim 29, wherein said step of winding the product comprises winding tape.

* * * * *